(12) United States Patent
Huang et al.

(10) Patent No.: US 12,238,358 B2
(45) Date of Patent: Feb. 25, 2025

(54) REMOTE IMAGE PROCESSING METHOD AND APPARATUS

(71) Applicant: HUAWEI TECHNOLOGIES CO., LTD., Shenzhen (CN)

(72) Inventors: Yin Huang, Shenzhen (CN); Huaping Xiong, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 108 days.

(21) Appl. No.: 17/962,216

(22) Filed: Oct. 7, 2022

(65) Prior Publication Data
US 2023/0033785 A1   Feb. 2, 2023

Related U.S. Application Data

(63) Continuation of application No. PCT/CN2021/083554, filed on Mar. 29, 2021.

(30) Foreign Application Priority Data

Apr. 10, 2020   (CN) .......................... 202010280905.4

(51) Int. Cl.
*H04N 21/2662* (2011.01)
*H04N 21/4402* (2011.01)

(52) U.S. Cl.
CPC . *H04N 21/2662* (2013.01); *H04N 21/440263* (2013.01)

(58) Field of Classification Search
None
See application file for complete search history.

(56) References Cited

U.S. PATENT DOCUMENTS 8,135,061 B1 *  3/2012  Ganesan ................ H04N 19/14
                                               375/240.03
11,226,731 B1 * 1/2022  Burfitt .................. H04N 21/816
                       (Continued)

FOREIGN PATENT DOCUMENTS

CN          102348116 A      2/2012
CN          106791854 A      5/2017
                  (Continued)

OTHER PUBLICATIONS

Muntean et al., "Region of Interest-Based Adaptive Multimedia Streaming Scheme," IEEE Transactions on Broadcasting, vol. 54, No. 2, IEEE Service Center, Piscataway, NJ, US, XP011343416, Total 8 pages (Jun. 1, 2008).

*Primary Examiner* — Junior O Mendoza
(74) *Attorney, Agent, or Firm* — Leydig, Voit & Mayer, Ltd.

(57) ABSTRACT

A remote image processing method, applied to a remote server, includes: obtaining a recommended bit rate, where the recommended bit rate matches an environment parameter of a network in which the remote server is located, and the network environment parameter is used to represent a capability of transmitting an amount of data by the network in a unit time; and generating, based on the recommended bit rate, adjustment parameters corresponding to different regions in a to-be-processed image, and processing the corresponding regions by using the adjustment parameters, to obtain a single-frame image used for display, so that an amount of data included in the single-frame image matches the recommended bit rate.

20 Claims, 7 Drawing Sheets

---

S1  Obtain a recommended bit rate

S2  Generate, based on the recommended bit rate, adjustment parameters corresponding to different regions in a to-be-processed image, and process the corresponding regions by using the adjustment parameters, to obtain a single-frame image used for display

(56) References Cited

U.S. PATENT DOCUMENTS

| | | | |
|---|---|---|---|
| 2014/0321532 A1* | 10/2014 | Ghat | H04N 19/124 |
| | | | 375/240.03 |
| 2015/0350726 A1* | 12/2015 | Tan | H04N 19/136 |
| | | | 348/441 |
| 2019/0246104 A1 | 8/2019 | Liu | |
| 2019/0310472 A1* | 10/2019 | Schilt | G06F 3/015 |
| 2019/0379893 A1 | 12/2019 | Krishnan | |
| 2020/0322696 A1* | 10/2020 | Dvir | H04N 21/816 |

FOREIGN PATENT DOCUMENTS

| | | | | |
|---|---|---|---|---|
| CN | 110784745 A | | 2/2020 | |
| WO | WO-2013155880 A1 * | 10/2013 | | H04N 19/115 |

* cited by examiner

REMOTE IMAGE PROCESSING METHOD AND APPARATUS

CROSS-REFERENCE TO RELATED APPLICATIONS

This application is a continuation of International Application No. PCT/CN2021/083554, filed on Mar. 29, 2021, which claims priority to Chinese Patent Application No. 202010280905.4, filed on Apr. 10, 2020. The disclosures of the aforementioned applications are hereby incorporated by reference in their entireties.

TECHNICAL FIELD

This application relates to the field of image processing technologies, and in particular, to a remote image processing method and apparatus.

BACKGROUND

A remote image processing technology is widely applied to fields such as videos, games, education, and medical treatment. The remote image processing technology is usually applied to an image transmission system. FIG. 1 is a schematic diagram of a structure of an image transmission system according to the present disclosure. As shown in FIG. 1, the image transmission system includes a remote server 100 configured to generate an image, a client 300 configured to display the image to a user, and a network device 200 configured to implement image transmission between the client 300 and the remote server 100.

Smoothness of a video presented by the client 300 is one of important factors affecting user experience. The video presented by the client 300 includes images transmitted by the remote server 100 in a unit time. A larger quantity of images transmitted by the remote server 100 leads to a smoother video. A bit rate is usually used to generate a video. The bit rate refers to an amount of data transmitted in a unit time during data transmission. In the case of a same data amount corresponding to all images, a higher bit rate indicates higher smoothness of the video, and a lower bit rate indicates lower smoothness of the video. In addition, only when the bit rate matches a network environment, for example, only when a bit rate used by the remote server 100 matches a network environment parameter of a network in which the remote server 100 is located, it can be ensured that an effect corresponding to the bit rate can be achieved for a transmitted video. Therefore, to ensure smoothness of the video, the remote server 100 adjusts the used bit rate based on the network environment parameter of the network in which the remote server 100 is located.

In addition, definition of the video presented by the client 300 is also one of the important factors affecting user experience. Generally, a larger amount of data included in each image in the video indicates a clearer video, and a smaller amount of data included in each image in the video indicates a more blurred video. Generally, to ensure smoothness of the video, the remote server 100 changes an amount of data included in an image. For example, data amounts corresponding to all regions in an image are increased to match an increased bit rate, or data amounts corresponding to all regions in an image are reduced to match a reduced bit rate. However, when amounts of data in images are increased, because an increased data amount corresponding to the entire video is limited, an increased data amount evenly allocated to each image is relatively small, and definition of the video is increased to a relatively small extent. When data amounts corresponding to all regions in an image are reduced, definition of a main viewing region of a user is also reduced, causing a significant decrease in user experience.

SUMMARY

The present disclosure provides a remote image processing method and apparatus, to dynamically adjust an amount of data included in each image in a video to match a corresponding bit rate, so that definition of the video is increased while smoothness of the video is ensured.

The present disclosure provides a remote image processing method, applied to a remote server and including: obtaining a recommended bit rate, where the recommended bit rate matches an environment parameter of a network in which the remote server is located, and the network environment parameter is used to represent a capability of transmitting an amount of data by the network in a unit time; and generating, based on the recommended bit rate, adjustment parameters corresponding to different regions in a to-be-processed image, and processing the corresponding regions by using the adjustment parameters, to obtain a single-frame image used for display, so that an amount of data included in the single-frame image matches the recommended bit rate.

In this way, an adjustment parameter corresponding to each region in the to-be-processed image can be generated to independently adjust each region in the to-be-processed image while ensuring transmission smoothness of the single-frame image, so that definition of the single-frame image meets a user requirement.

In an implementation, the generating, based on the recommended bit rate, adjustment parameters corresponding to different regions in a to-be-processed image, and processing the corresponding regions by using the adjustment parameters, to obtain a single-frame image used for display includes: if the recommended bit rate is reduced, generating a corresponding adjustment parameter based on the recommended bit rate, where a data amount of a single-frame image obtained by using the adjustment parameter is reduced; or if the recommended bit rate is increased, generating a corresponding adjustment parameter based on the recommended bit rate, where a data amount of a single-frame image obtained by using the adjustment parameter is increased.

In this way, the data amount corresponding to the generated single-frame image can be adjusted by using the adjustment parameter to match the recommended bit rate, to adapt to the network environment parameter, so that transmission smoothness of the single-frame image is ensured, and definition of the single-frame image is also increased.

In an implementation, the generating, based on the recommended bit rate, adjustment parameters corresponding to different regions in a to-be-processed image includes: calculating the adjustment parameter based on the recommended bit rate by using a preset parameter calculation model.

In this way, an adjustment parameter corresponding to each region can be accurately calculated by using the parameter calculation model.

In an implementation, the generating, based on the recommended bit rate, adjustment parameters corresponding to different regions in a to-be-processed image includes: calculating the adjustment parameter based on the recommended bit rate by using a parameter calculation formula.

In this way, an adjustment parameter corresponding to each region can be accurately calculated by using the parameter calculation formula.

In an implementation, the generating, based on the recommended bit rate, adjustment parameters corresponding to different regions in a to-be-processed image includes: determining, based on the recommended bit rate, a parameter selection range corresponding to the recommended bit rate, where the parameter selection range includes at least one parameter; and selecting the adjustment parameter from the parameter selection range.

In this way, the adjustment parameter can be quickly determined through simple matching between the recommended bit rate and the parameter selection range.

In an implementation, the adjustment parameter includes a region size, and the processing the corresponding regions by using the adjustment parameters, to obtain a single-frame image used for display includes: adjusting a size of a corresponding region in the to-be-processed image by using the region size to obtain the single-frame image, to adjust the amount of data included in the single-frame image.

In this way, a region size of each region can be adjusted to adjust a data amount corresponding to each region, so that the single-frame image corresponds to a data amount complying with the recommended bit rate.

In an implementation, the adjustment parameter includes an image parameter, and the processing the corresponding regions by using the adjustment parameters, to obtain a single-frame image used for display includes: processing a corresponding region in the to-be-processed image by using the image parameter to obtain the single-frame image, to adjust the amount of data included in the single-frame image.

In this way, an image parameter of each region can be adjusted to adjust a data amount corresponding to each region, so that the single-frame image corresponds to a data amount complying with the recommended bit rate.

Optionally, if the image parameter is resolution, the resolution is increased to increase a data amount of an image of a corresponding partition, and the resolution is reduced to reduce the data amount of the image of the corresponding partition; if the image parameter is a compression rate, the compression rate is increased to reduce a data amount of an image of a corresponding partition, and the compression rate is reduced to increase the data amount of the image of the corresponding partition; or if the image parameter is a quantity of sampling points, the quantity of sampling points is increased to increase a data amount of an image of a corresponding partition, and the quantity of sampling points is reduced to reduce the data amount of the image of the corresponding partition.

In an implementation, the adjustment parameter includes a region size and an image parameter, and the processing the corresponding regions by using the adjustment parameters, to obtain a single-frame image used for display includes: adjusting a size of a corresponding region in the to-be-processed image by using the region size and processing a corresponding region in the to-be-processed image by using the image parameter to obtain the single-frame image, to adjust the amount of data included in the single-frame image.

In this way, the regions can be adjusted by using a combination of the region size and the image parameter, so that the adjustment manner is more flexible, and the obtained single-frame image better meets a user requirement.

In an implementation, the to-be-processed image includes at least two regions.

In this way, a change of definition of the to-be-processed image can be smoother and better comply with a visual habit of a user, so that user experience can be improved.

The present disclosure further provides a remote image processing apparatus, applied to a remote server and including: a data collection unit, configured to obtain a recommended bit rate, where the recommended bit rate matches an environment parameter of a network in which the remote server is located, and the network environment parameter is used to represent a capability of transmitting an amount of data by the network in a unit time; and a processing unit, configured to: generate, based on the recommended bit rate, adjustment parameters corresponding to different regions in a to-be-processed image, and process the corresponding regions by using the adjustment parameters, to obtain a single-frame image used for display, so that an amount of data included in the single-frame image matches the recommended bit rate.

In this way, an adjustment parameter corresponding to each region in the to-be-processed image can be generated to independently adjust each region in the to-be-processed image while ensuring transmission smoothness of the single-frame image, so that definition of the single-frame image meets a user requirement.

Optionally, the processing unit is further configured to: if the recommended bit rate is reduced, generate a corresponding adjustment parameter based on the recommended bit rate, where a data amount of a single-frame image obtained by using the adjustment parameter is reduced; or if the recommended bit rate is increased, generate a corresponding adjustment parameter based on the recommended bit rate, where a data amount of a single-frame image obtained by using the adjustment parameter is increased.

In this way, the data amount corresponding to the generated single-frame image can be adjusted by using the adjustment parameter to match the recommended bit rate, to adapt to the network environment parameter, so that transmission smoothness of the single-frame image is ensured, and definition of the single-frame image is also increased.

Optionally, the processing unit is further configured to calculate the adjustment parameter based on the recommended bit rate by using a preset parameter calculation model.

In this way, an adjustment parameter corresponding to each region can be accurately calculated by using the parameter calculation model.

Optionally, the processing unit is further configured to calculate the adjustment parameter based on the recommended bit rate by using a parameter calculation formula.

In this way, an adjustment parameter corresponding to each region can be accurately calculated by using the parameter calculation formula.

Optionally, the processing unit is further configured to: determine, based on the recommended bit rate, a parameter selection range corresponding to the recommended bit rate, where the parameter selection range includes at least one parameter; and select the adjustment parameter from the parameter selection range.

In this way, the adjustment parameter can be quickly determined through simple matching between the recommended bit rate and the parameter selection range.

Optionally, the adjustment parameter includes a region size, and the processing unit is further configured to adjust a size of a corresponding region in the to-be-processed image by using the region size to obtain the single-frame image, to adjust the amount of data included in the single-frame image.

In this way, a region size of each region can be adjusted to adjust a data amount corresponding to each region, so that the single-frame image corresponds to a data amount complying with the recommended bit rate.

Optionally, the adjustment parameter includes an image parameter, and the processing unit is further configured to process a corresponding region in the to-be-processed image by using the image parameter to obtain the single-frame image, to adjust the amount of data included in the single-frame image.

In this way, an image parameter of each region can be adjusted to adjust a data amount corresponding to each region, so that the single-frame image corresponds to a data amount complying with the recommended bit rate.

Optionally, the processing unit is further configured to: if the image parameter is resolution, increase the resolution to increase a data amount of an image of a corresponding partition, and reduce the resolution to reduce the data amount of the image of the corresponding partition; if the image parameter is a compression rate, increase the compression rate to reduce a data amount of an image of a corresponding partition, and reduce the compression rate to increase the data amount of the image of the corresponding partition; or if the image parameter is a quantity of sampling points, increase the quantity of sampling points to increase a data amount of an image of a corresponding partition, and reduce the quantity of sampling points to reduce the data amount of the image of the corresponding partition.

Optionally, the adjustment parameter includes a region size and an image parameter, and the processing unit is further configured to: adjust a size of a corresponding region in the to-be-processed image by using the region size and process a corresponding region in the to-be-processed image by using the image parameter to obtain the single-frame image, to adjust the amount of data included in the single-frame image.

In this way, the regions can be adjusted by using a combination of the region size and the image parameter, so that the adjustment manner is more flexible, and the obtained single-frame image better meets a user requirement.

Optionally, the to-be-processed image includes at least two regions.

In this way, a change of definition of the to-be-processed image can be smoother and better comply with a visual habit of a user, so that user experience can be improved.

The present disclosure further provides a server, including a memory and a processor. The memory is coupled to the processor, the memory is configured to store computer program code, the computer program code includes computer instructions, and when the processor executes the computer instructions, the server performs a corresponding remote image processing method.

The present disclosure further provides an image transmission system, including a client, a server, and a network device. The client is connected to the server by using the network device, to implement image transmission. Any one of the client, the server, and the network device is a network environment monitoring node, configured to obtain a network environment parameter. Any one of the client, the server, and the network device is a computing node, configured to calculate a recommended bit rate based on the network environment parameter. The server performs a corresponding remote image processing method.

The present disclosure further provides a chip system. The chip system includes a processor, configured to: support the foregoing apparatus or device in implementing the functions in the foregoing aspects and the implementations of the foregoing aspects, for example, obtaining a recommended bit rate matching a network environment parameter; and generating, based on the recommended bit rate, adjustment parameters corresponding to different regions in a to-be-processed image, and separately adjusting the corresponding regions by using the adjustment parameters, to obtain a single-frame image including an amount of data matching the recommended bit rate.

BRIEF DESCRIPTION OF DRAWINGS

To describe technical solutions in this application more clearly, the following briefly describes the accompanying drawings. It is clear that a person of ordinary skill in the art may derive other drawings from these accompanying drawings without creative efforts.

DESCRIPTION OF EMBODIMENTS

The following clearly describes technical solutions in embodiments of the present disclosure with reference to the accompanying drawings. It is clear that the described embodiments are merely a part rather than all of embodiments of the present disclosure. All other embodiments obtained by a person of ordinary skill in the art based on embodiments of the present disclosure without creative efforts shall fall within the scope of the present disclosure.

Figure 1:
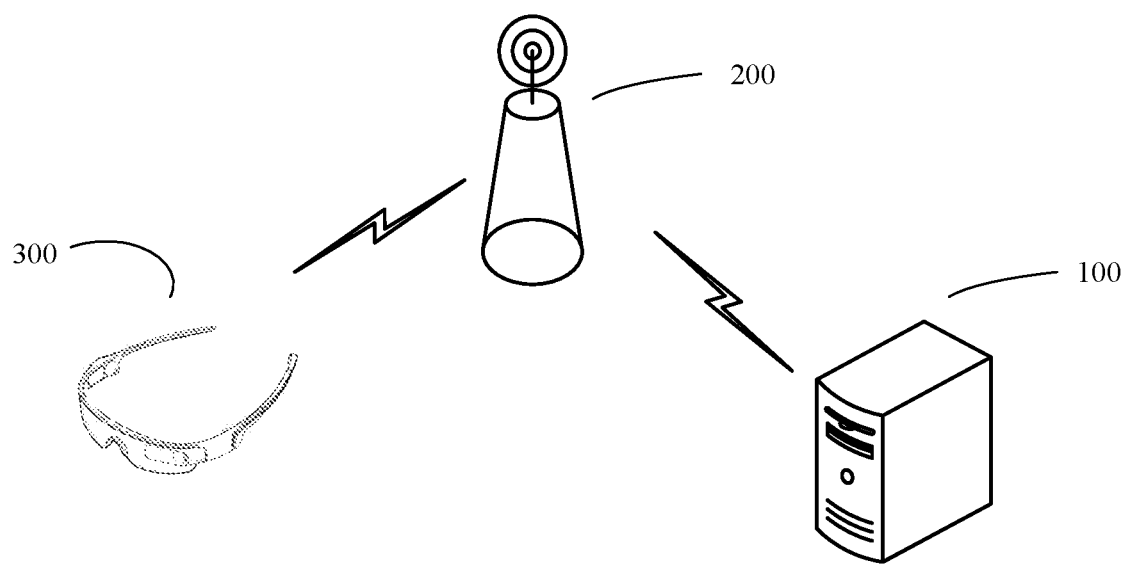
FIG. 1 is a schematic diagram of a structure of an image transmission system according to the present disclosure.

As shown in FIG. 1, a remote image processing method provided in the present disclosure is applied to a remote server 100, and an image transmission system in which the remote server 100 is located further includes a client 300 and a network device 200.

Figure 2:
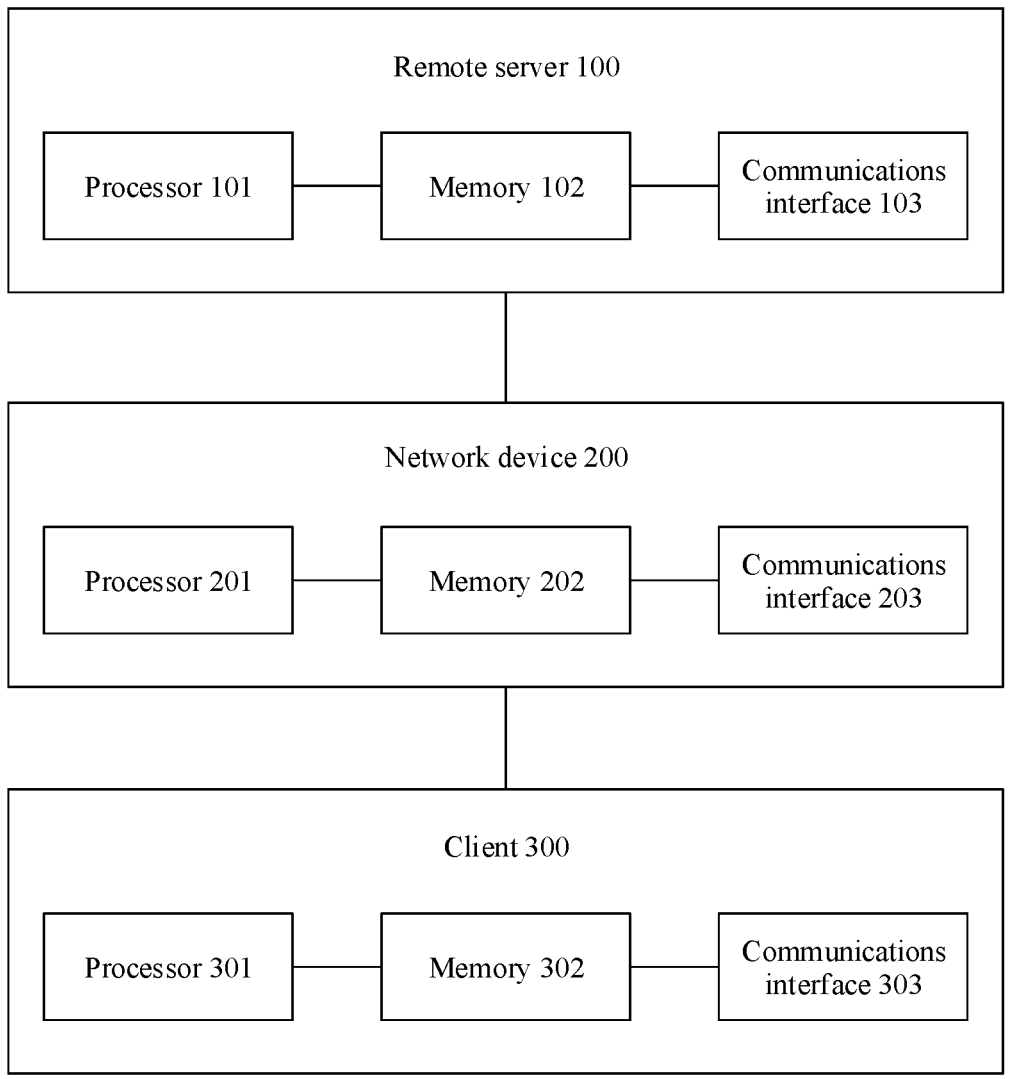
FIG. 2 is a schematic diagram of a hardware structure of an image transmission system according to an embodiment of the present disclosure.

The client 300 may be a terminal device, for example, a computer, a mobile phone, a tablet computer, or a cloud virtual reality (Cloud VR) device, with an image display function, a data collection function, and a data processing function. FIG. 2 is a schematic diagram of a hardware structure of an image transmission system according to an embodiment of the present disclosure. The client 300 may include at least one processor, at least one memory, and at least one communications interface. Taking FIG. 2 as an example, the client 300 includes a processor 301, a memory 302, and a communications interface 303. The processor 301, the memory 302, and the communications interface 303 are coupled, the memory 302 stores program instructions, and the processor 301 may invoke the program instructions in the memory 302, so that the client 300 performs a related method, for example, collects a network environment parameter or calculates a recommended bit rate. The communications interface 303 is configured to establish a communications link with the network device, to send the recommended bit rate, the network environment parameter, an image obtaining request, and the like. The communications interface 303 may include one or more optical fiber link interfaces, Ethernet interfaces, microwave link interfaces, copper wire interfaces, or the like.

The network device 200 may be a device, for example, a router, a switch, a network host, or a base station, with a data forwarding function, a data collection function, and a data processing function. The network device 200 may include at least one processor, at least one memory, and at least one communications interface. Taking FIG. 2 as an example, the network device 200 includes a processor 201, a memory 202, and a communications interface 203. The processor 201, the memory 202, and the communications interface 203 are coupled, the memory 202 stores program instructions, and the processor 201 may invoke the program instructions in the memory 202, so that the network device 200 performs a related method, for example, collects a network environment parameter or calculates a recommended bit rate. The communications interface 203 is configured to establish communications links with the client 300 and the remote server 100, to send the recommended bit rate, the network environment parameter, an image obtaining request, an image, and the like. The communications interface 203 may include one or more optical fiber link interfaces, Ethernet interfaces, microwave link interfaces, copper wire interfaces, or the like.

The remote server 100 may be a device, for example, a server or a cluster (which may include a bypass device) including servers, a virtual machine provided by a cloud service, or a computer, with image rendering, coding, data collection, and data processing functions. The remote server 100 may include at least one processor, at least one memory, and at least one interface unit. Taking FIG. 2 as an example, the remote server 100 includes a processor 101, a memory 102, and a communications interface 103. The processor 101, the memory 102, and the communications interface 103 are coupled, the memory 102 stores program instructions, and the processor 101 may invoke the program instructions in the memory 102, so that the remote server 100 performs a related method, for example, performs image rendering, performs image coding, collects a network environment parameter, or calculates a recommended bit rate. The communications interface 103 is configured to establish a communications link with the network device 200, to receive the recommended bit rate, receive the network environment parameter, receive an image obtaining request, send an image, and the like. The communications interface 103 may include one or more optical fiber link interfaces, Ethernet interfaces, microwave link interfaces, copper wire interfaces, or the like.

The processor mentioned in this embodiment of the present disclosure may include one or more processing units such as a system on a chip (SoC), a central processing unit (CPU), a microcontroller (MCU), and a storage controller. Different processing units may be independent components, or may be integrated into one or more processors.

The memory mentioned in this embodiment of the present disclosure may include one or more storage units, for example, may include a volatile memory such as a dynamic random access memory (DRAM) or a static random access memory (SRAM), and may further include a non-volatile memory (NVM) such as a read-only memory (ROM) or a flash memory. Different storage units may be independent components, or may be integrated or packaged into one or more processors or communications interfaces and become a part of the processor or the communications interface.

The communications interface mentioned in this embodiment of the present disclosure may include a network adapter, a network interface card, a local area network adapter (LAN adapter), a network interface controller (NIC), a modem, and the like. The communications interface may be an independent component, or may be partially or completely integrated or packaged in the processor and become a part of the processor.

Figure 3:
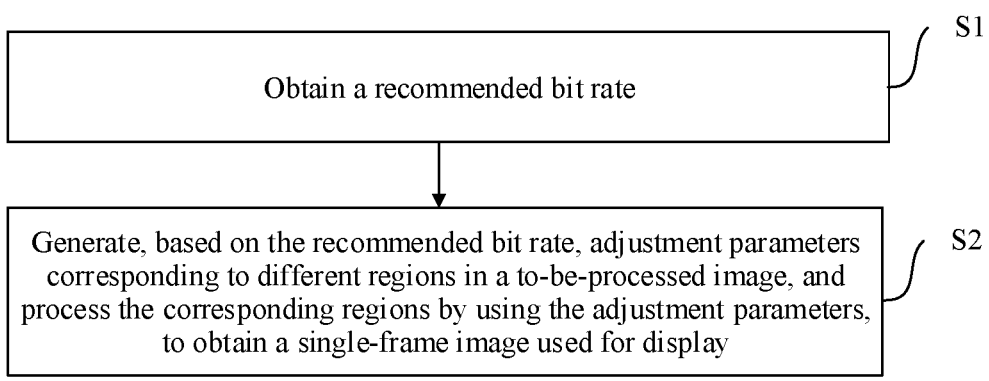
FIG. 3 is a flowchart of a remote image processing method according to an embodiment of the present disclosure.

FIG. 3 is a flowchart of a remote image processing method according to an embodiment of the present disclosure. The method is applied to a remote server 100, as shown in FIG. 1. The method includes the following steps.

S1: Obtain a recommended bit rate, where the recommended bit rate matches an environment parameter of a network in which the remote server is located.

S2: Generate, based on the recommended bit rate, adjustment parameters corresponding to different regions in a to-be-processed image, and process corresponding regions by using the adjustment parameters, to obtain a single-frame image used for display, so that an amount of data included in the single-frame image matches the recommended bit rate.

A client 300 sends an image obtaining request to the remote server 100 by using a network device 200 based on a user requirement. The client 300 has a function of collecting user information. For example, the client 300 may collect user information by collecting user actions such as clicking, pressing, sliding, head rotation, and body movement, or collect user information by collecting user line-of-sight information such as eye movement and a focusing position. The client 300 may generate the image obtaining request based on the collected user information, or may generate the image obtaining request by using information such as a user ID (Identity Document) and a device number. The client 300 sends the generated image obtaining request to the network device 200, and the network device 200 further forwards the generated image obtaining request to the remote server 100.

After receiving the image obtaining request, the remote server 100 generates a corresponding image based on the request, and sends the generated image to the network device 200 in a form of a video stream. Then the network device 200 forwards the generated image to the client 300 for display to a user. To ensure smoothness of a video, the remote server 100 needs to generate an image corresponding to the recommended bit rate matching the network environment parameter. Therefore, the remote server 100 first needs to obtain the recommended bit rate. The recommended bit rate is calculated based on the network environment parameter. Therefore, a primary task of an image transmission system is to collect the network environment parameter by monitoring a network.

The client 300, the network device 200, or the remote server 100 may be used as a network environment monitoring node, and dynamically collect the network environment parameter. The network environment parameter is mainly a network environment parameter between the client 300 and the remote server 100. Specifically, in an implementation, the network environment monitoring node may collect the network environment parameter based on a preset period, to dynamically update the recommended bit rate, so that the recommended bit rate used by the remote server 100 is more consistent with the network environment parameter. In another implementation, the network environment monitoring node may collect the network environment parameter at a preset time point, for example, in a network usage peak period or a network usage valley period, to dynamically update the recommended bit rate. In another implementation, the network environment monitoring node may obtain the image obtaining request generated by the client 300, and obtain the user information from the image obtaining request. In this way, the network environment monitoring node may collect the network environment parameter when obtaining preset user information such as a change of a requirement of the user on image definition, to dynamically update the recommended bit rate.

After the network environment monitoring node collects the network environment parameter, a computing node calculates the corresponding recommended bit rate based on the network environment parameter. The computing node may be the client 300, the network device 200, or the remote server 100. Specifically, the recommended bit rate may be calculated through the following process.

S101: The computing node obtains the network environment parameter from the network environment monitoring node, and calculates a remaining bandwidth value of the network based on the network environment parameter.

The network environment parameter may be a remaining bandwidth value. Herein, the remaining bandwidth value refers to a data amount corresponding to the network for transmitting an image, and a magnitude of the remaining bandwidth value can represent a capability of transmitting an amount of data by the network in a unit time. Alternatively, the network environment parameter is a bandwidth value of the network and a used bandwidth value of the network. The used bandwidth value usually refers to a data amount corresponding to the network for transmitting non-image data. Therefore, a remaining bandwidth value of the network may be obtained by calculating a difference between the foregoing two parameters. Alternatively, the network environment parameter is a ratio of a bandwidth value of the network to a data amount of the network for transmitting an image. Therefore, a remaining bandwidth value of the network may be obtained by calculating a product of the foregoing two parameters. Alternatively, the network environment parameter may be another parameter for obtaining a remaining bandwidth value of the network in a manner such as calculation.

S102: The computing node determines a relationship between the remaining bandwidth value and a preset remaining bandwidth range.

S103: If the remaining bandwidth value is greater than the preset remaining bandwidth range, increase a bit rate currently used by the remote server to a recommended bit rate corresponding to the remaining bandwidth value.

S104: If the remaining bandwidth value falls within the preset remaining bandwidth range, determine a bit rate currently used by the remote server as the recommended bit rate.

S105: If the remaining bandwidth value is less than the preset remaining bandwidth range, the computing node receives a packet retransmission quantity sent by the network environment monitoring node, and determines a relationship between the packet retransmission quantity and a preset packet retransmission quantity threshold.

If the packet retransmission quantity is greater than the preset packet retransmission quantity threshold, a bit rate currently used by the remote server is reduced to the recommended bit rate, so that a corresponding packet retransmission quantity when the remote server uses the recommended bit rate is less than or equal to the preset packet retransmission quantity threshold; or if the packet retransmission quantity is less than or equal to the preset packet retransmission quantity threshold, a bit rate currently used by the remote server is determined as the recommended bit rate.

After calculating the recommended bit rate, the computing node may automatically send the recommended bit rate to the remote server 100, or send the recommended bit rate to the remote server 100 based on a recommended bit rate obtaining request of the remote server 100.

Figure 4:
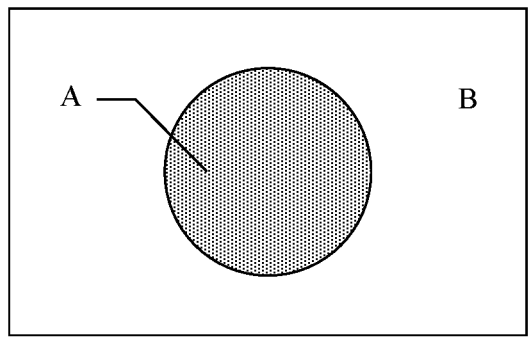
FIG. 4 is a schematic diagram of region division of a to-be-processed image according to an embodiment of the present disclosure.
Figure 5:
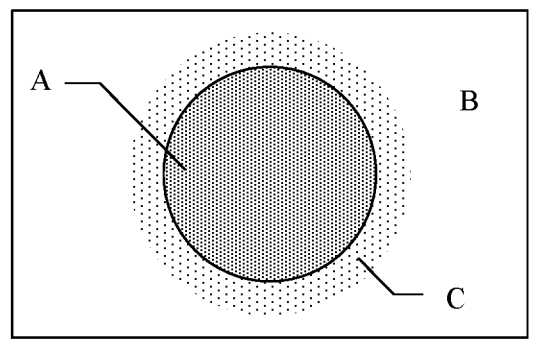
FIG. 5 is a schematic diagram of region division of a to-be-processed image according to an embodiment of the present disclosure.

After obtaining the recommended bit rate, the remote server 100 generates, based on the recommended bit rate, an adjustment parameter corresponding to the to-be-processed image. The to-be-processed image is an image that needs to be generated or processed by the remote server 100 based on the image obtaining request of the client 300. In this embodiment, a minimum unit for which an adjustment parameter is generated is each region in the to-be-processed image. Corresponding adjustment parameters may be separately generated based on different requirements of different regions in the to-be-processed image, and then corresponding regions may be independently adjusted by using the adjustment parameters. FIG. 4 is a schematic diagram of region division of a to-be-processed image according to an embodiment of the present disclosure. As shown in FIG. 4, for example, the to-be-processed image is divided into two regions. A region A is a fixation point region, and a region B is a non-fixation point region. If the client 300 is a cloud VR device, the client 300 displays an image in imitation of a line-of-sight range of human eyes. A region corresponding to the line-of-sight range is a fixation point region, and a corresponding region beyond the line-of-sight range is a non-fixation point region. To improve user experience, different definition may be set for the fixation point region and the non-fixation point region, and definition of the fixation point region is mainly ensured, so that the user can browse a clearer image. Lower definition may be used for a region invisible to the user. Certainly, the to-be-processed image may be alternatively divided into three or more regions. FIG. 5 is a schematic diagram of region division of a to-be-processed image according to an embodiment of the present disclosure. It can be learned that the to-be-processed image is divided into three regions. A region C is disposed between a region A and a region B, definition of an image corresponding to the region C falls between that of an image corresponding to the region A and that of an image corresponding to the region B, and the region C is equivalent to a transition region. Therefore, changes in definition of all regions in the to-be-processed image are smooth, and there is no relatively obvious definition boundary on a generated single-frame image, so that the single-frame image is relatively suitable for being accepted by human eyes.

The to-be-processed image provided in this embodiment may be divided into regions in another shape and form. In addition, the regions may correspond to same definition or different definition.

Definition of the single-frame image is determined by an amount of data included in the single-frame image. When the amount of data included in the single-frame image is larger, the definition of the single-frame image is higher; and when the amount of data included in the single-frame image is smaller, the definition of the single-frame image is lower. Further, when a data amount corresponding to a region in the single-frame image is larger, definition of the region is larger; and when a data amount corresponding to a region in the single-frame image is smaller, definition of the region is lower. In addition, the amount of data included in the single-frame image needs to correspond to the recommended bit rate, to ensure image transmission smoothness. In this embodiment of the present disclosure, data amounts corresponding to all the regions in the to-be-processed image may be separately adjusted to correspond to the recommended bit rate. In this way, images corresponding to all the regions in the to-be-processed image can meet different definition requirements, so that user experience is improved.

The adjustment parameter changes with the recommended bit rate according to the following rule: When the recommended bit rate is less than the bit rate currently used by the remote server 100, it needs to be ensured that the data amount of the single-frame image obtained by using the generated adjustment parameter is reduced, to ensure smooth transmission of the single-frame image. When the recommended bit rate is greater than the bit rate currently used by the remote server 100, it needs to be ensured that the data amount of the single-frame image obtained by using the generated adjustment parameter is increased, to improve definition of the single-frame image.

Specifically, adjustment parameters corresponding to different regions in the to-be-processed image may be generated based on the recommended bit rate in the following manners.

In the first implementation, the adjustment parameter may be calculated based on the recommended bit rate by using a preset parameter calculation model.

In this implementation, a parameter calculation model may be designed in advance, and the recommended bit rate may be input to the parameter calculation model to obtain adjustment parameters corresponding to different regions in the to-be-processed image. In this implementation, an example parameter calculation model is provided. The parameter calculation model includes a parameter input module, an image information input module, an image data amount calculation module, a region data amount calculation module, and an adjustment parameter calculation module. Specifically, the parameter input module inputs the recommended bit rate to the model, and the image information input module inputs user information to the model. The image information may be obtained based on the user information, and includes at least information about each region in the to-be-processed image, for example, positioning of each region in the to-be-processed image, boundary information of each region, and a region type (a definition requirement) such as a fixation point region, a transition region, or a non-fixation point region corresponding to each region. The image data amount calculation module receives the recommended bit rate, calculates an amount of data included in the to-be-processed image, and inputs a calculation result to the region data amount calculation module. The region data amount calculation module calculates, based on the amount of data included in the to-be-processed image and image information corresponding to each region in the to-be-processed image, a data amount corresponding to each region, and inputs the data amount corresponding to each region to the adjustment parameter calculation module. The adjustment parameter calculation module calculates, based on the data amount corresponding to each region, an adjustment parameter corresponding to each region.

In this way, the adjustment parameter corresponding to each region in the to-be-processed image can be accurately calculated by using the parameter calculation model, so that a data amount corresponding to each region after a single-frame image is generated based on the corresponding adjustment parameter can match the recommended bit rate and further match the network environment parameter, thereby ensuring transmission smoothness and definition of the single-frame image. It should be noted that, calculation models, other than the parameter calculation model disclosed in this implementation, for calculating, through region division, adjustment parameters (data amounts) corresponding to different regions in the image may be used. The calculation models are not listed herein.

In the second implementation, the adjustment parameter may be calculated based on the recommended bit rate by using a parameter calculation formula.

In this implementation, an adjustment parameter corresponding to each region in the to-be-processed image may be calculated by using the parameter calculation formula, for example, $D_r = D_0 + (M_r - M_0) \times k$. $D_r$ represents an adjustment parameter corresponding to a region, $D_0$ represents a basic adjustment parameter corresponding to the region, $M_r$ represents the recommended bit rate, $M_0$ represents a bit rate corresponding to the basic adjustment parameter, and k represents an adjustment parameter change value corresponding to a unit bit rate. One basic adjustment parameter may be preset for each region in the to-be-processed image, and on the basis of the basic adjustment parameter, an adjustment parameter change value may be increased or reduced based on a bit rate change, to obtain the adjustment parameter corresponding to each region in the to-be-processed image, so that a single-frame image is generated for each region based on the corresponding adjustment parameter. It should be noted that calculation formulas, other than the parameter calculation formula disclosed in this implementation, for calculating an adjustment parameter may be alternatively used. The calculation formulas are not listed herein.

In the third implementation, a parameter selection range corresponding to the recommended bit rate may be determined based on the recommended bit rate, where the parameter selection range includes at least one parameter; and the adjustment parameter is selected from the parameter selection range.

In this implementation, a correspondence between a bit rate and a parameter used to generate an image may be set based on an empirical value or historical adjustment data. In this implementation, an example correspondence is provided. In an example in which the to-be-processed image includes two regions, when the bit rate is 1-10, a parameter selection range corresponding to the fixation point region is 20-25, and a parameter selection range corresponding to the non-fixation point region is 10-15; when the bit rate is 11-20, a parameter selection range corresponding to the fixation point region is 26-30, and a parameter selection range corresponding to the non-fixation point region is 16-20; and when the bit rate is 21-30, a parameter selection range corresponding to the fixation point region is 31-35, and a parameter selection range corresponding to the non-fixation point region is 21-35. If the recommended bit rate is 12, an adjustment parameter corresponding to the fixation point region needs to be selected from 26-30, and an adjustment parameter corresponding to the non-fixation point region needs to be selected from 16-20. For example, the adjustment parameter of the fixation point region is 28, and the adjustment parameter of the non-fixation point region is 18. In this way, a parameter selection range corresponding to each region can be determined based on the recommended bit rate, and an adjustment parameter corresponding to each region can be further determined. It should be noted that correspondences other than the correspondence disclosed in this implementation may be alternatively used. The correspondences are not listed herein.

Generally, the to-be-processed image corresponds to an initial image format. For example, each region in the image has an initial region size (area), and each region in the image has an initial data amount (initial definition). The calculated adjustment parameter may be different from the initial image format. Therefore, a corresponding adjustment may be performed on the to-be-processed image based on the adjustment parameter to obtain the single-frame image.

Figure 6:
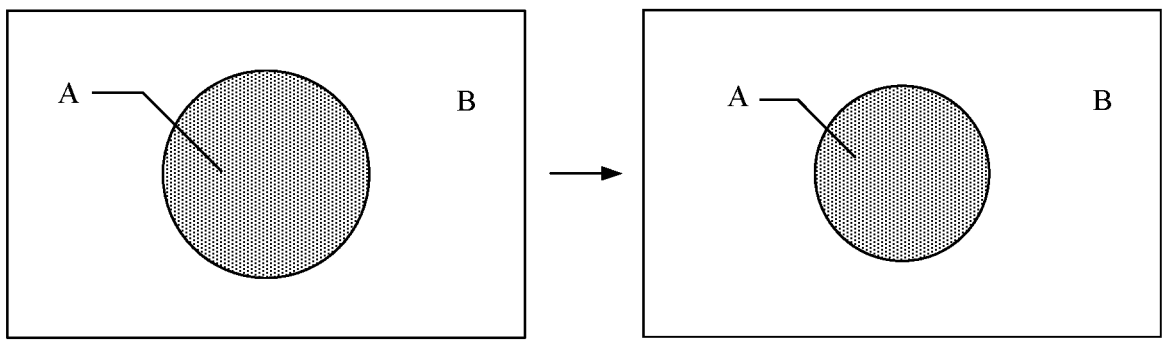
FIG. 6 is a schematic diagram of an effect of a region size adjustment according to an embodiment of the present disclosure.

The calculated adjustment parameter may include a region size and/or an image parameter. The region size is an area size corresponding to each region in the to-be-processed image, and the image parameter is resolution or a compression rate. A specific adjustment process is as follows:

In the first implementation, the adjustment parameter includes the region size, and a size of a corresponding region in the to-be-processed image is adjusted by using the region size to obtain the single-frame image, to adjust the amount of data included in the single-frame image. FIG. 6 is a schematic diagram of an effect of a region size adjustment according to an embodiment of the present disclosure. When the region size is different from an initial region size corresponding to each region in the to-be-processed image, the size corresponding to each region in the to-be-processed image is adjusted based on the region size. FIG. 6 uses an example in which the to-be-processed image includes two regions: a fixation point region A and a non-fixation point region B. On the left of FIG. 6 are initial region sizes corresponding to the region A and the region B. A region size corresponding to the region A becomes smaller, and a region size corresponding to the region B becomes larger accordingly. In this case, the region A and the region B are adjusted based on adjustment parameters to obtain a single-frame image shown on the right of FIG. 6. The adjustment process shown in FIG. 6 is applicable to a case in which the recommended bit rate is reduced. Definition of the region A is greater than definition of the region B. Correspondingly, in the case of a same area, a data amount corresponding to the region A is greater than a data amount corresponding to the region B. To match the recommended bit rate, the data amount corresponding to the to-be-processed image needs to be reduced. In this case, if an area of the region A is appropriately reduced, and an area of the region B is increased accordingly, the data amount corresponding to the to-be-processed image can be effectively reduced, to match the reduced recommended bit rate and further meet a requirement for smooth transmission of the single-frame image. In addition, it can be further ensured that the region A exists in the obtained single-frame image, so that the user can browse an image region with relatively high definition, thereby ensuring user experience.

Figure 7:
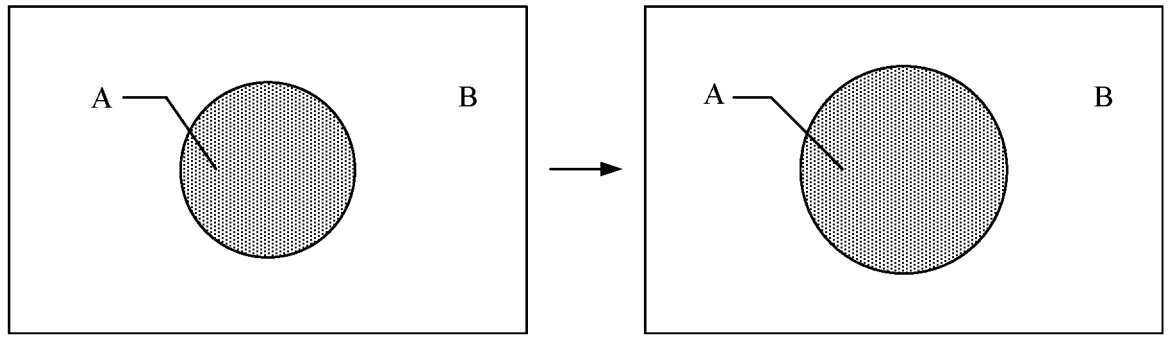
FIG. 7 is a schematic diagram of an effect of another region size adjustment according to an embodiment of the present disclosure.

On the contrary, FIG. 7 is a schematic diagram of an effect of another region size adjustment according to an embodiment of the present disclosure. FIG. 7 also uses an example in which the to-be-processed image includes two regions: a fixation point region A and a non-fixation point region B. On the left of FIG. 7 are initial region sizes corresponding to the region A and the region B. A region size corresponding to the region A becomes larger, and a region size corresponding to the region B becomes smaller accordingly. In this case, the region A and the region B are adjusted based on adjustment parameters to obtain a single-frame image shown on the right of FIG. 7. The adjustment process shown in FIG. 7 is applicable to a case in which the recommended bit rate is increased. If an area of the region A is appropriately increased, and an area of the region B is reduced accordingly, the data amount corresponding to the to-be-processed image can be effectively increased, to match the increased recommended bit rate. Therefore, a requirement for smooth transmission of the single-frame image can be met, and the area of the region A can be further increased, so that the user can browse a wider image region with relatively high definition, thereby improving user experience.

In the second implementation, the adjustment parameter includes the image parameter, and a corresponding region in the to-be-processed image is processed by using the image parameter to obtain the single-frame image, to adjust the amount of data included in the single-frame image.

Figure 8:
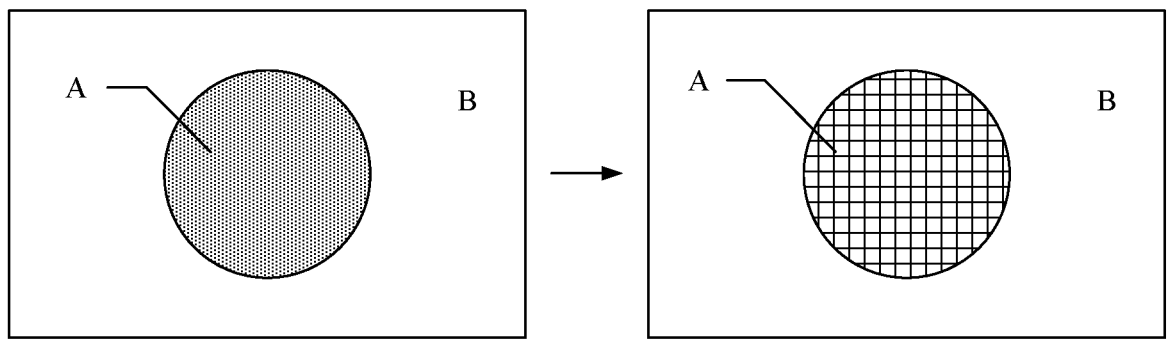
FIG. 8 is a schematic diagram of an effect of an image parameter adjustment according to an embodiment of the present disclosure.

FIG. 8 is a schematic diagram of an effect of an image parameter adjustment according to an embodiment of the present disclosure. When the image parameter is different from an initial region size corresponding to each region in the to-be-processed image, each region in the to-be-processed image is correspondingly adjusted based on the image parameter. FIG. 8 uses an example in which the to-be-processed image includes two regions: a fixation point region A and a non-fixation point region B. On the left of FIG. 8 are initial image parameters corresponding to the region A and the region B. For example, if the image parameter is resolution, resolution corresponding to the region A is reduced, and resolution corresponding to the region B is also reduced. In this case, the region A and the region B are adjusted based on adjustment parameters to obtain a single-frame image shown on the right of FIG. 8. The adjustment process shown in FIG. 8 is applicable to a case in which the recommended bit rate is reduced. To match the reduced recommended bit rate, the data amount corresponding to the to-be-processed image needs to be reduced. In this case, if the resolution of the region A and the resolution of the region B are appropriately reduced, the data amount corresponding to the to-be-processed image can be effectively reduced, to match the reduced recommended bit rate and further meet a requirement for transmission smoothness of the single-frame image.

Optionally, to adapt to the reduced recommended bit rate, only the resolution of the region A or the region B may be reduced. In the process of adjusting the resolution, the resolution corresponding to the region A and the region B may be the same or different.

Optionally, the image parameter may be a compression rate. Specifically, to match a reduced recommended bit rate, a compression rate of the region A and/or a compression rate of the region B may be increased to reduce a data amount of an image of a corresponding region. For an adjustment effect, refer to FIG. 8. The compression rates of the region A and the region B may be the same or different.

Optionally, to adapt to the reduced recommended bit rate, a quantity of sampling points in the region A and/or a quantity of sampling points in the region B may be reduced to reduce a data amount of an image of a corresponding region. For an adjustment effect, refer to FIG. 8. Reduced quantities of sampling points in the region A and the region B may be the same or different.

Figure 9:
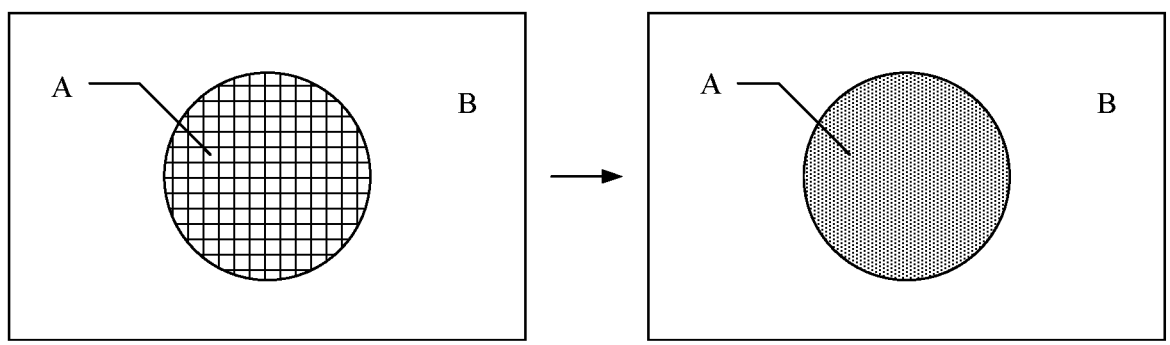
FIG. 9 is a schematic diagram of an effect of another image parameter adjustment according to an embodiment of the present disclosure.

On the contrary, FIG. 9 is a schematic diagram of an effect of another image parameter adjustment according to an embodiment of the present disclosure. FIG. 9 also uses an example in which the to-be-processed image includes two regions: a fixation point region A and a non-fixation point region B. For example, in FIG. 9, the image parameter is resolution. On the left of FIG. 9 is initial resolution corresponding to the region A and the region B. Resolution corresponding to the region A is increased, and resolution corresponding to the region B is also increased. In this case, the region A and the region B are adjusted based on adjustment parameters to obtain a single-frame image shown on the right of FIG. 9. The adjustment process shown in FIG. 9 is applicable to a case in which the recommended bit rate is increased. If the resolution of the region A and the region B is appropriately increased, the data amount corresponding to the to-be-processed image may be increased to match the increased recommended bit rate, so that a requirement for transmission smoothness of the single-frame image can be met, definition of the single-frame image can be increased, and user experience can be further improved.

Optionally, to adapt to the increased recommended bit rate, only the resolution of the region A or the region B may be increased. In the process of adjusting the resolution, the resolution corresponding to the region A and the region B may be the same or different.

Optionally, the image parameter may be a compression rate. Specifically, to match an increased recommended bit rate, a compression rate of the region A and/or a compression rate of the region B may be reduced to increase definition of an image of a corresponding region. For an adjustment effect, refer to FIG. 9. The compression rates of the region A and the region B may be the same or different.

Optionally, to adapt to the increased recommended bit rate, a quantity of sampling points in the region A and/or a quantity of sampling points in the region B may be increased to increase definition of an image of a corresponding region. For an adjustment effect, refer to FIG. 9. Increased quantities of sampling points in the region A and the region B may be the same or different.

In the third implementation, the adjustment parameter includes the region size and the image parameter, and a size of a corresponding region in the to-be-processed image is adjusted by using the region size and a corresponding region in the to-be-processed image is processed by using the image parameter to obtain the single-frame image, to adjust the amount of data included in the single-frame image.

Figure 10:
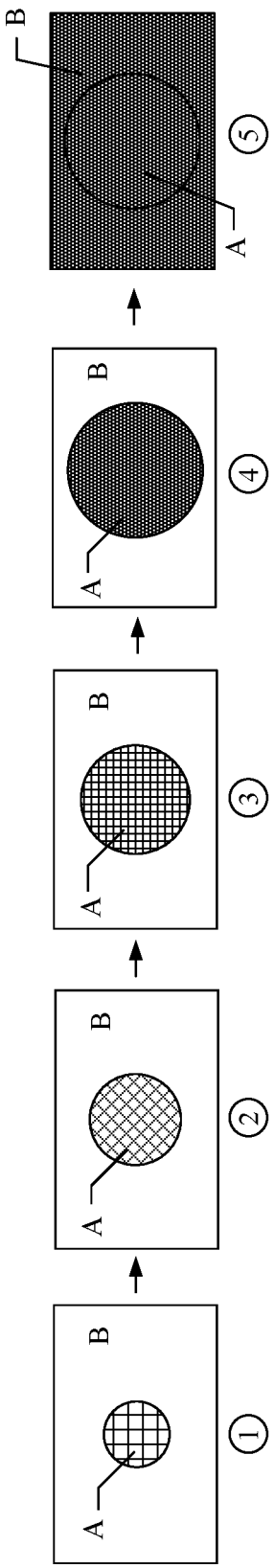
FIG. 10 is a schematic diagram of an effect of a region size and image parameter adjustment according to an embodiment of the present disclosure.

In this implementation, the adjustment parameter includes the region size and the image parameter, and adjustments to the region size and the image parameter are combined, so that the to-be-processed image can be more flexibly adjusted. This implementation provides an adjustment example. A specific process is as follows:

FIG. 10 is a schematic diagram of an effect of a region size and image parameter adjustment according to an embodiment of the present disclosure. FIG. 10 uses an example in which the to-be-processed image includes two regions: a fixation point region A and a non-fixation point region B, to display an adjustment process of adapting to an increase of the recommended bit rate. ① in FIG. 10 shows initial image formats of the region A and the region B. As the recommended bit rate is increased, first, as shown in ② in FIG. 10, a region size of the region A is increased to a small extent, and an image parameter of the region A is also adjusted to a small extent, to increase a data amount corresponding to the region A. Then, as shown in ③ in FIG. 10, the region size of the region A continues to be increased to a small extent, and the image parameter of the region A is also adjusted to a great extent, to increase, to a great extent, the data amount corresponding to the region A. Then, as shown in ④ in FIG. 10, the region size of the region A continues to be increased, and the image parameter corresponding to the region A continues to be adjusted, to continue to increase the data amount corresponding to the region A. When the recommended bit rate is sufficiently high, as shown in ⑤ in FIG. 10, the image parameter of the region A may be adjusted until the data amount corresponding to the region A reaches a preset data amount threshold. In this case, the region size of the region A is gradually increased, or an image parameter of the region B is gradually adjusted, so that a data amount corresponding to the region B is increased until the region A and the region B have same definition.

Figure 11:
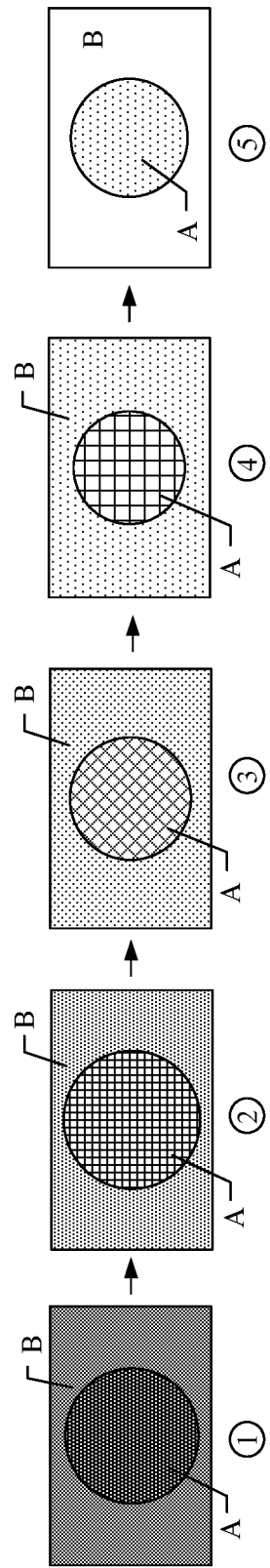
FIG. 11 is a schematic diagram of an effect of a region size and image parameter adjustment according to an embodiment of the present disclosure.

FIG. 11 is a schematic diagram of an effect of a region size and image parameter adjustment according to an embodiment of the present disclosure. FIG. 11 uses an example in which the to-be-processed image includes two regions: a fixation point region A and a non-fixation point region B, to display an adjustment process of adapting to a reduction of the recommended bit rate. ① in FIG. 11 shows initial image formats of the region A and the region B. As the recommended bit rate is reduced, first, as shown in ② in FIG. 11, a region size of the region A is reduced to a small extent, and an image parameter of the region B is also adjusted to a small extent, to reduce a data amount corresponding to the region B. Then, as shown in ③ in FIG. 11, the region size of the region A continues to be reduced, and the image parameter of the region B is also adjusted, to reduce the data amount corresponding to the region B. Then, as shown in ④ in FIG. 11, when the region size of the region A reaches a preset region size threshold, an image parameter corresponding to the region A starts to be adjusted to reduce a data amount corresponding to the region A. When the recommended bit rate is excessively small, as shown in ⑤ in FIG. 11, the image parameter of the region A may be further adjusted to reduce the data amount corresponding to the region A, and the image parameter of the region B may be further adjusted to further reduce the data amount corresponding to the region B.

For the foregoing case of matching the increased or reduced recommended bit rate, the region size and the image parameter may be alternatively adjusted in another adjustment manner, to obtain a single-frame image meeting a user requirement.

In the foregoing embodiments, the solutions of the remote image processing method provided in the present disclosure are separately described from a perspective of interaction between the remote server 100, the network device 200, and the client 300. It may be understood that, to achieve the foregoing functions, each device includes a corresponding hardware structure and/or software module for implementing each function. A person skilled in the art should easily be aware that, in combination with the examples described in the embodiments disclosed in this specification, units and algorithm steps may be implemented by hardware or a combination of hardware and computer software in this application. Whether a function is performed by hardware or hardware driven by computer software depends on particular applications and design constraints of respective technical solutions. A person skilled in the art may use different methods to implement the described functions for each particular application, but it should not be considered that the implementation goes beyond the scope of this application.

For example, the remote server 100 may implement a corresponding function by using a software module.

Figure 12:
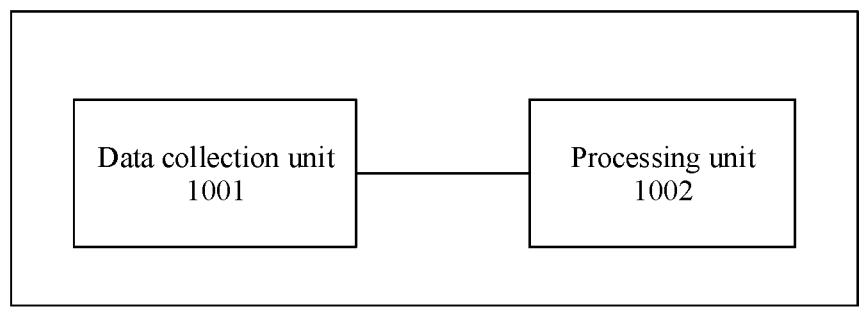
FIG. 12 is a schematic diagram of a structure of a remote image processing apparatus according to an embodiment of the present disclosure.

In an embodiment, as shown in FIG. 12, a remote image processing apparatus configured to implement functions of the remote server 100 includes: a data collection unit 1001, configured to obtain a recommended bit rate, where the recommended bit rate matches an environment parameter of a network in which the remote server is located, and the network environment parameter is used to represent a capability of transmitting an amount of data by the network in a unit time; and a processing unit 1002, configured to: generate, based on the recommended bit rate, adjustment parameters corresponding to different regions in a to-be-processed image, and process the corresponding regions by using the adjustment parameters, to obtain a single-frame image used for display, so that an amount of data included in the single-frame image matches the recommended bit rate.

Optionally, the processing unit 1002 is further configured to: if the recommended bit rate is reduced, generate a corresponding adjustment parameter based on the recommended bit rate, where a data amount of a single-frame image obtained by using the adjustment parameter is reduced; or if the recommended bit rate is increased, generate a corresponding adjustment parameter based on the recommended bit rate, where a data amount of a single-frame image obtained by using the adjustment parameter is increased.

Optionally, the processing unit 1002 is further configured to calculate the adjustment parameter based on the recommended bit rate by using a preset parameter calculation model.

Optionally, the processing unit 1002 is further configured to calculate the adjustment parameter based on the recommended bit rate by using a parameter calculation formula.

Optionally, the processing unit 1002 is further configured to: determine, based on the recommended bit rate, a parameter selection range corresponding to the recommended bit rate, where the parameter selection range includes at least one parameter; and select the adjustment parameter from the parameter selection range.

Optionally, the adjustment parameter includes a region size, and the processing unit 1002 is further configured to adjust a size of a corresponding region in the to-be-processed image by using the region size to obtain the single-frame image, to adjust the amount of data included in the single-frame image.

Optionally, the adjustment parameter includes an image parameter, and the processing unit 1002 is further configured to process a corresponding region in the to-be-processed image by using the image parameter to obtain the single-frame image, to adjust the amount of data included in the single-frame image.

Optionally, the processing unit 1002 is further configured to: if the image parameter is resolution, increase the resolution to increase a data amount of an image of a corresponding partition, and reduce the resolution to reduce the data amount of the image of the corresponding partition; if the image parameter is a compression rate, increase the compression rate to reduce a data amount of an image of a corresponding partition, and reduce the compression rate to increase the data amount of the image of the corresponding partition; or if the image parameter is a quantity of sampling points, increase the quantity of sampling points to increase a data amount of an image of a corresponding partition, and reduce the quantity of sampling points to reduce the data amount of the image of the corresponding partition.

Optionally, the adjustment parameter includes a region size and an image parameter, and the processing unit 1002 is further configured to: adjust a size of a corresponding region in the to-be-processed image by using the region size and process a corresponding region in the to-be-processed image by using the image parameter to obtain the single-frame image, to adjust the amount of data included in the single-frame image.

Optionally, the to-be-processed image includes at least two regions.

An embodiment of the present disclosure further provides a computer storage medium. The computer storage medium stores computer instructions, and when the computer instructions run on a computer, the computer performs the methods in the foregoing embodiments.

An embodiment of the present disclosure further provides a computer program product including instructions. When the computer program product runs on a computer, the computer performs the methods in the foregoing embodiments.

The present disclosure further provides a chip system. The chip system includes a processor, configured to support the foregoing apparatus or device in implementing the functions in the foregoing aspects, for example, generating or processing the information in the foregoing methods. In a possible design, the chip system further includes a memory, configured to store program instructions and data that are necessary for the apparatus or the device. The chip system may include a chip, or may include a chip and another discrete component.

Objectives, technical solutions, and benefits of the present disclosure are described in detail in the foregoing example embodiments. It should be understood that the foregoing descriptions are merely example embodiments of the present disclosure, and are not intended to limit the protection scope of the present disclosure. Any modification, equivalent replacement, or improvement made within the spirit and principle of the present disclosure may fall within the protection scope of the present disclosure.

What is claimed is:

1. A remote image processing method, comprising:
obtaining, by a remote server, a recommended bit rate, wherein the recommended bit rate is based on an environment parameter of a network in which the remote server is located, and the network environment parameter represents a capability of transmitting an amount of data by the network in a unit time; and
generating, by the remote server, based on the recommended bit rate, adjustment parameters corresponding to different regions in a to-be-processed image, and processing the corresponding regions by using the adjustment parameters, to obtain a single-frame image for display, wherein an amount of data comprised in the single-frame image is based on the recommended bit rate;
wherein the adjustment parameters comprise a region size; and wherein processing the corresponding regions by using the adjustment parameters comprises: adjusting a size of a respective corresponding region in the to-be-processed image using the region size to obtain the single-frame image, wherein based on adjusting the size of the respective corresponding region, an area occupied by the respective corresponding region in the to-be-processed image is increased or decreased.

2. The method according to claim 1, wherein generating the adjustment parameters and processing the corresponding regions comprises:
based on the recommended bit rate being reduced, generating a corresponding adjustment parameter based on the recommended bit rate corresponding to a reduction of a data amount of a single-frame image obtained by using the adjustment parameter; or
based on the recommended bit rate being increased, generating a corresponding adjustment parameter based on the recommended bit rate corresponding to an increase of a data amount of a single-frame image obtained by using the adjustment parameter.

3. The method according to claim 1, wherein generating the adjustment parameters comprises:
calculating the adjustment parameters based on the recommended bit rate by using a preset parameter calculation model.

4. The method according to claim 1, wherein generating the adjustment parameters comprises:
calculating the adjustment parameters based on the recommended bit rate by using a parameter calculation formula.

5. The method according to claim 1, wherein generating the adjustment parameters comprises:
determining, based on the recommended bit rate, a parameter selection range corresponding to the recommended bit rate, wherein the parameter selection range comprises at least one parameter; and
selecting the adjustment parameters from the parameter selection range.

6. The method according to claim 1, wherein a respective adjustment parameter comprises an image parameter; and
wherein processing the corresponding regions comprises:
processing a corresponding region in the to-be-processed image by using the image parameter to adjust the amount of data comprised in the single-frame image.

7. The method according to claim 6, wherein:
based on the image parameter being resolution, the resolution is increased to increase a data amount of an image of a corresponding partition, or the resolution is reduced to reduce the data amount of the image of the corresponding partition;
based on the image parameter being a compression rate, the compression rate is increased to reduce a data amount of an image of a corresponding partition, or the compression rate is reduced to increase the data amount of the image of the corresponding partition; or
based on the image parameter being a quantity of sampling points, the quantity of sampling points is increased to increase a data amount of an image of a corresponding partition, or the quantity of sampling points is reduced to reduce the data amount of the image of the corresponding partition.

8. The method according to claim 1, wherein the to-be-processed image comprises at least two regions.

9. A remote server, comprising:
a memory having processor-executable instructions stored thereon; and
a processor configured to execute the processor-executable instructions to facilitate the following being performed by the remote server:
obtaining a recommended bit rate, wherein the recommended bit rate is based on an environment parameter of a network in which the remote server is located, and the network environment parameter represents a capability of transmitting an amount of data by the network in a unit time; and
generating, based on the recommended bit rate, adjustment parameters corresponding to different regions in a to-be-processed image, and processing the corresponding regions by using the adjustment parameters, to obtain a single-frame image for display, so that an amount of data comprised in the single-frame image is based on the recommended bit rate;
wherein the adjustment parameters comprise a region size; and
wherein processing the corresponding regions by using the adjustment parameters comprises: adjusting a size of a respective corresponding region in the to-be-processed image using the region size to obtain the single-frame image, wherein based on adjusting the size of the respective corresponding region, an area occupied by the respective corresponding region in the to-be-processed image is increased or decreased.

10. The remote server according to claim 9, wherein the processor is further configured to execute the processor-executable instructions to facilitate the following being performed by the remote server:
based on the recommended bit rate being reduced, generating a corresponding adjustment parameter based on the recommended bit rate corresponding to reduction of a data amount of a single-frame image obtained by using the adjustment parameter; or
based on the recommended bit rate being increased, generating a corresponding adjustment parameter based on the recommended bit rate corresponding to increase of a data amount of a single-frame image obtained by using the adjustment parameter.

11. The remote server according to claim 9, wherein generating the adjustment parameters comprises:
calculating the adjustment parameters based on the recommended bit rate by using a preset parameter calculation model.

12. The remote server according to claim 9 wherein generating the adjustment parameters comprises:
calculating the adjustment parameters based on the recommended bit rate by using a parameter calculation formula.

13. The remote server according to claim 9, wherein generating the adjustment parameters comprises:
determining, based on the recommended bit rate, a parameter selection range corresponding to the recommended bit rate, wherein the parameter selection range comprises at least one parameter; and
selecting the adjustment parameters from the parameter selection range.

14. The remote server according to claim 9, wherein a respective adjustment parameter comprises an image parameter; and
wherein processing the corresponding regions comprises:
processing a corresponding region in the to-be-processed image by using the image parameter to adjust the amount of data comprised in the single-frame image.

15. The remote server according to claim 14, wherein the processor is further configured to execute the processor-executable instructions to facilitate the following being performed by the remote server:
   based on the image parameter being resolution, increasing the resolution to increase a data amount of an image of a corresponding partition, or reducing the resolution to reduce the data amount of the image of the corresponding partition;
   based on the image parameter being a compression rate, increasing the compression rate to reduce a data amount of an image of a corresponding partition, or reducing the compression rate to increase the data amount of the image of the corresponding partition; or
   based on the image parameter being a quantity of sampling points, increasing the quantity of sampling points to increase a data amount of an image of a corresponding partition, or reducing the quantity of sampling points to reduce the data amount of the image of the corresponding partition.

16. An image transmission system, comprising:
   a client;
   a remote server; and
   a network device;
   wherein the client is connected to the remote server by using the network device, to implement image transmission;
   wherein the client, the remote server, or the network device is configured to obtain a network environment parameter; and
   wherein the client, the remote server, or the network device is configured to calculate a recommended bit rate based on the network environment parameter; and
   wherein the remote server is configured to:
      obtain the recommended bit rate, wherein the recommended bit rate is based on the environment parameter of a network in which the remote server is located, and the network environment parameter represents a capability of transmitting an amount of data by the network in a unit time; and
      generate, based on the recommended bit rate, adjustment parameters corresponding to different regions in a to-be-processed image, and process the corresponding regions by using the adjustment parameters, to obtain a single-frame image for display, wherein an amount of data comprised in the single-frame image is based on the recommended bit rate;
      wherein the adjustment parameters comprise a region size; and
      wherein processing the corresponding regions by using the adjustment parameters comprises: adjusting a size of a respective corresponding region in the to-be-processed image using the region size to obtain the single-frame image, wherein based on adjusting the size of the respective corresponding region, an area occupied by the respective corresponding region in the to-be-processed image is increased or decreased.

17. The image transmission system according to claim 16, wherein generating the adjustment parameters and processing the corresponding regions comprises:
   based on the recommended bit rate being reduced, generating a corresponding adjustment parameter based on the recommended bit rate corresponding to a reduction of a data amount of a single-frame image obtained by using the adjustment parameter; or
   based on the recommended bit rate being increased, generating a corresponding adjustment parameter based on the recommended bit rate corresponding to an increase of a data amount of a single-frame image obtained by using the adjustment parameter.

18. The image transmission system according to claim 16, wherein generating the adjustment parameters comprises:
   calculating the adjustment parameters based on the recommended bit rate by using a preset parameter calculation model.

19. The image transmission system according to claim 16, wherein generating the adjustment parameters comprises:
   calculating the adjustment parameters based on the recommended bit rate by using a parameter calculation formula.

20. The image transmission system according to claim 16, wherein generating the adjustment parameters comprises:
   determining, based on the recommended bit rate, a parameter selection range corresponding to the recommended bit rate, wherein the parameter selection range comprises at least one parameter; and
   selecting the adjustment parameters from the parameter selection range.

* * * * *